United States Patent
Hirota et al.

(10) Patent No.: US 10,890,879 B2
(45) Date of Patent: Jan. 12, 2021

(54) ELECTRONIC WATCH AND COMMUNICATION CONTROL SYSTEM

(71) Applicant: CITIZEN WATCH CO., LTD., Tokyo (JP)

(72) Inventors: Yusuke Hirota, Nishitokyo (JP); Masayuki Araki, Nishitokyo (JP); Akiyoshi Kondoh, Tokyo (JP); Masato Kanazawa, Tokyo (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 366 days.

(21) Appl. No.: 16/082,536

(22) PCT Filed: Mar. 15, 2017

(86) PCT No.: PCT/JP2017/010547
§ 371 (c)(1),
(2) Date: Sep. 6, 2018

(87) PCT Pub. No.: WO2017/159761
PCT Pub. Date: Sep. 21, 2017

(65) Prior Publication Data
US 2019/0079463 A1    Mar. 14, 2019

(30) Foreign Application Priority Data
Mar. 15, 2016 (JP) ................ 2016-051590

(51) Int. Cl.
*G04G 19/06* (2006.01)
*G04C 10/04* (2006.01)
(Continued)

(52) U.S. Cl.
CPC ............ *G04G 19/06* (2013.01); *G04C 10/04* (2013.01); *G04G 19/00* (2013.01); *G04G 19/12* (2013.01);
(Continued)

(58) Field of Classification Search
CPC ........ G04G 19/00; G04G 19/06; G04G 19/12; G04C 10/04; G04R 20/26
See application file for complete search history.

(56) References Cited

U.S. PATENT DOCUMENTS 5,774,057 A    6/1998   Kalbermatter
9,575,526 B2*   2/2017   Nagahama ................ G06F 1/26
(Continued)

FOREIGN PATENT DOCUMENTS

CN        1183697 A    6/1998
CN     101383692 A    3/2009
(Continued)

OTHER PUBLICATIONS

English translation of the International Search Report for PCT/JP2017/010547.
(Continued)

*Primary Examiner* — Edwin A. Leon
*Assistant Examiner* — Jason M Collins
(74) *Attorney, Agent, or Firm* — HEA Law PLLC

(57) ABSTRACT

Provided is an electronic clock including: a power generator; a secondary battery, which is to be charged with electric power generated by the power generator; a balance information transmitter configured to transmit, to a computer, balance information relating to a transition of a power generation amount or a charging balance of the secondary battery; a connection time period setting module configured to set a connection time period of a connection with the computer based on the balance information; and a communication controller configured to control a start and an end of communication to/from the computer based on the connection time period.

15 Claims, 10 Drawing Sheets

(51) Int. Cl.
*G04G 19/12* (2006.01)
*G04G 21/04* (2013.01)
*G04G 19/00* (2006.01)
*G04G 21/00* (2010.01)
*G06F 1/3287* (2019.01)

(52) U.S. Cl.
CPC ............ *G04G 21/00* (2013.01); *G04G 21/04* (2013.01); *G06F 1/3287* (2013.01)

(56) References Cited

U.S. PATENT DOCUMENTS

| | | | |
|---|---|---|---|
| 10,368,312 B2* | 7/2019 | Li | G01R 31/3835 |
| 2001/0055986 A1 | 12/2001 | Odagiri | |
| 2009/0067850 A1 | 3/2009 | Mizutani et al. | |
| 2011/0136437 A1* | 6/2011 | Zhao | H04W 52/0261 455/41.2 |
| 2012/0056480 A1 | 3/2012 | Sakumoto et al. | |
| 2013/0058197 A1 | 3/2013 | Yonekura | |
| 2013/0077633 A1 | 3/2013 | Mizutani et al. | |
| 2016/0105841 A1* | 4/2016 | Kang | H02J 50/80 455/41.2 |

FOREIGN PATENT DOCUMENTS

| | | |
|---|---|---|
| JP | H11-052035 A | 2/1999 |
| JP | 2006-208006 A | 8/2006 |
| JP | 2011-103565 A | 5/2011 |
| JP | 2013-057515 A | 3/2013 |
| JP | 2015-175602 A | 10/2015 |
| JP | 2015-184254 A | 10/2015 |

OTHER PUBLICATIONS

Search Report dated Oct. 16, 2019, for corresponding EP Patent Application No. 17766757.3.

* cited by examiner

| DATE | TIME | POWER GENERATION AMOUNT [μW] | BATTERY VOLTAGE [V] | IN-USE FUNCTION |
|---|---|---|---|---|
| 11/8 | 23:50 | P1 | V1 | CURRENT TIME DISPLAY |
| | 23:45 | P2 | V2 | CURRENT TIME DISPLAY |
| | 23:40 | P3 | V3 | CURRENT TIME DISPLAY MAIL NOTIFICATION |
| | 0:00 | P4 | V4 | CURRENT TIME DISPLAY |
| 11/7 | 23:00 | P5 | V5 | CURRENT TIME DISPLAY |
| | 22:00 | P6 | V6 | CURRENT TIME DISPLAY ALARM |
| | 1:00 | P7 | V7 | CURRENT TIME DISPLAY |
| | 0:00 | P8 | V8 | CURRENT TIME DISPLAY |
| 11/6 | 23:00 | P9 | V9 | CURRENT TIME DISPLAY |
| 11/2 | 0:00 | P10 | V10 | CURRENT TIME DISPLAY |

FIG.7
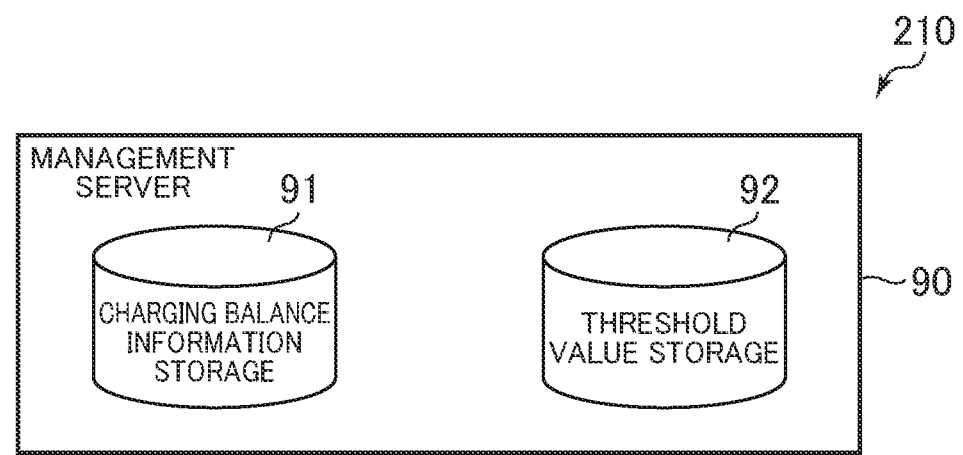
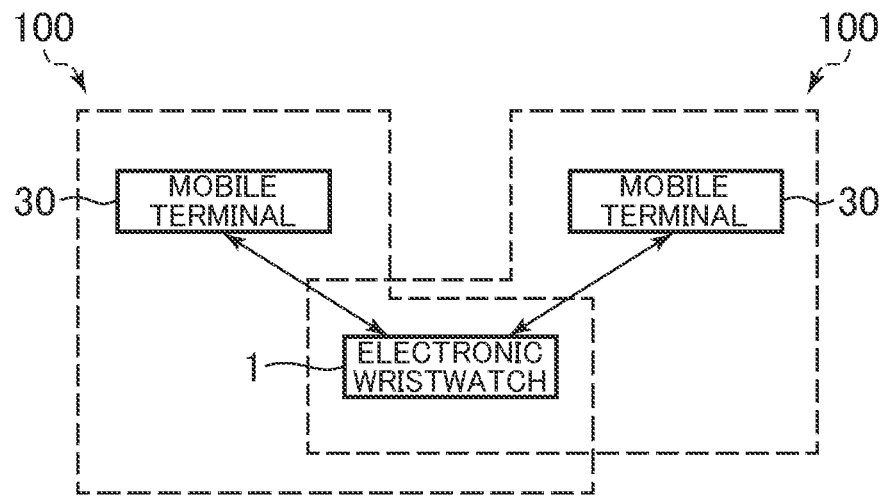

ELECTRONIC WATCH AND COMMUNICATION CONTROL SYSTEM

CROSS REFERENCE TO RELATED APPLICATIONS

This application is a National Stage of International Application No. PCT/JP2017/010547 filed on Mar. 15, 2017, which claims priority from Japanese Patent Application 2016-051590, filed on Mar. 15, 2016. The contents of the above document is incorporated herein by reference in its entirety.

TECHNICAL FIELD

The present invention relates to an electronic clock and a communication control system.

BACKGROUND ART

In some cases, an electronic clock includes a secondary battery configured to store electric power generated by a solar battery or other such power generator, and operates a stepping motor with the secondary battery being used as an electric power source to drive hands. In another case, the electronic clock communicates to/from a smartphone or other such computer to display notification or the like received by the computer on the electronic clock.

For example, in Patent Literature 1, there is described an electronic clock, which is configured to calculate a speed by dividing a setting value acquired from an external device by a time period measured by time measuring means.

CITATION LIST

Patent Literature

[PTL 1] JP 2015-184254 A

SUMMARY OF INVENTION

Technical Problem

An electronic clock requires relatively large power consumption to communicate with a computer. Therefore, in some cases, power consumption is reduced by disconnecting communication to/from the computer during a time slot in which a user is not supposed to use the electronic clock, for example, at a night time.

In this case, a timing to disconnect the communication between the electronic clock and the computer is sometimes set uniformly in advance, and in some cases, a connected state between the electronic clock and the computer is released at a timing that is not intended by the user, which may impair the convenience of the user.

The present invention has been made in view of the above-mentioned circumstances, and has an object to provide an electronic clock and a communication control system for appropriately controlling a connection time period of a connection to a computer to improve the convenience of the user.

Solution to Problem

The invention disclosed in the present application to achieve the above-mentioned object has various aspects, and the representative aspects are outlined as follows.

(1) An electronic clock includes: a power generator; a secondary battery, which is to be charged with electric power generated by the power generator; a balance information transmitter configured to transmit, to a computer, balance information relating to a transition of a power generation amount or a charging balance of the secondary battery; a connection time period setting module configured to set a connection time period of a connection with the computer based on the balance information; and a communication controller configured to control a start and an end of communication to/from the computer based on the connection time period.

(2) The electronic clock according to the aspect (1) further includes a connection time period receiver configured to receive the connection time period determined by the computer.

(3) The electronic clock according to the aspect (1) or (2) further includes a balance information storage configured to store the balance information.

(4) In the electronic clock according to any one of the aspects (1) to (3), the communication controller includes: a start controller configured to start communication to/from the computer at a start time set in advance; and an end controller configured to end the communication to/from the computer at an end time being a time at which the connection time period has elapsed from the start time.

(5) The electronic clock according to any one of the aspects (1) to (4), further includes: a power generation amount measuring module configured to measure the power generation amount generated by the power generator; and an in-use function detector configured to detect a function in use, and the balance information transmitter is configured to transmit, to the computer, information relating to transitions of the power generation amount and the function in use.

(6) A communication control system includes: the electronic clock of any one of the aspects (1) to (5); and the computer, and the computer includes: a connection time period determiner configured to determine the connection time period based on the balance information; and a display configured to display a transition of the balance information and the connection time period.

(7) In the communication control system according to the aspect (6), the connection time period determiner includes an extended time period determiner configured to determine an extended time period to be added to the connection time period or a shortened time period based on the balance information.

(8) In the electronic clock according to any one of the aspects (1) to (5), the communication controller is configured to execute, when a predetermined condition is satisfied, temporary communication that terminates communication immediately after at least reception of time information from the computer and the transmission of the balance information to the computer.

(9) In the electronic clock according to the aspect (8), the predetermined condition includes a condition that a predetermined time period has elapsed within one day and surroundings of the electronic clock are bright.

(10) In the communication control system according to the aspect (6) or (7), the computer is configured to notify a user of a state relating to a continuous connection with the electronic clock.

(11) In the communication control system according to the aspect (10), the notification includes at least any one of expiration of a communication continuation time period, a warning relating to insufficiency of the power generation amount or the charging balance, a failure in achieving a target of the power generation amount or the charging balance set by the user, or a warning that the continuous connection has been disapproved.

(12) In the electronic clock according to any one of the aspects (1) to (5), (8), and (9), the communication controller is configured to permit both temporary communication and continuous communication, or disapprove the continuous communication while permitting only the temporary communication, based on a remaining amount of the secondary battery.

(13) In the communication control system according to any one of the aspects (6), (7), (10), and (11), the transition of the balance information to be displayed on the display is plotted through use of a scale that is not fixed.

(14) In the communication control system according to any one of the aspects (6), (7), (10), and (11), the transition of the balance information to be displayed on the display is plotted through use of an equal interval scale for the balance information.

(15) In the electronic clock according to any one of the aspects (1) to (5) and (8) to (10), the balance information has a resolution lowered, by an uneven rounding method, with respect to a measured value for obtaining the balance information.

Advantageous Effects of Invention

According to the above-mentioned aspect (1) of the present invention, it is possible to provide an electronic clock and a communication control system for appropriately controlling a connection time period of a connection with a computer to improve the convenience of the user.

Further, according to the above-mentioned aspect (2) of the present invention, it is possible to determine the connection time period by a more advanced method, and the connection time period of a connection with the computer is flexibly controlled.

Further, according to the above-mentioned aspect (3) of the present invention, even when a connection between the electronic clock and the computer is interrupted, information relating to an uninterrupted transition of the balance information is obtained, and the control of the connection time period conforming to the current situation is performed.

Further, according to the above-mentioned aspect (4) of the present invention, the electronic clock and the computer are connected to each other at a time suitable for the life rhythm of the user, which improves the convenience of the user.

Further, according to the above-mentioned aspect (5) of the present invention, the connection time period is determined based on the use status of the electronic clock, and the connection time period in which the behavior pattern of the user is reflected is set.

Further, according to the above-mentioned aspect (6) of the present invention, the computer having relatively abundant calculation resources is used to determine the connection time period and display the balance information and the connection time period so as to be visually recognizable, to thereby obtain the communication control system with the improved convenience of the user.

Further, according to the above-mentioned aspect (7) of the present invention, it is possible to extend the connection time period when there is a margin in the power generation amount or the charging balance, and the connection time period of a connection between the electronic clock and the computer can be controlled more flexibly.

Further, according to the above-mentioned aspect (8) or (9) of the present invention, before the user starts activities or when the user starts the activities, it is possible to accurately correct the time and set an appropriate connection time period and extended time period.

Further, according to the above-mentioned aspect (10) or (11) of the present invention, it is possible to encourage the user to consciously generate power.

Further, according to the above-mentioned aspect (12) of the present invention, it is possible to maintain an accurate time based on time correction, and to maintain a clock function by reducing the power consumption while causing the user to know the status of the power generation amount or the charging balance.

Further, according to the above-mentioned aspect (13) of the present invention, it is possible to enlarge a part that is important to the user so as to be displayed finely while displaying a rough tendency for a part that is not important to the user, which improves the convenience of the user.

Further, according to the above-mentioned aspect (14) of the present invention, it is easy for the user to grasp an influence to be exerted on the extended time period by a difference in power generation amount or charging balance.

Further, according to the above-mentioned aspect (15) of the present invention, only numerical values within a range important to the user are caused to have a high resolution, while those within the other range are caused to have a low resolution, and hence it is possible to reduce the overall amount of information without reducing the resolution for the range that is important to the user more than is required.

BRIEF DESCRIPTION OF DRAWINGS

FIG. 3 is a table for showing an example of charging balance information stored in a charging balance storage.

FIG. 7 is a functional block diagram relating to a modification example of the communication management system in the embodiment of the present invention.

DESCRIPTION OF EMBODIMENTS

Now, an embodiment of the present invention is described with reference to the accompanying drawings.

First Embodiment

Figure 1:
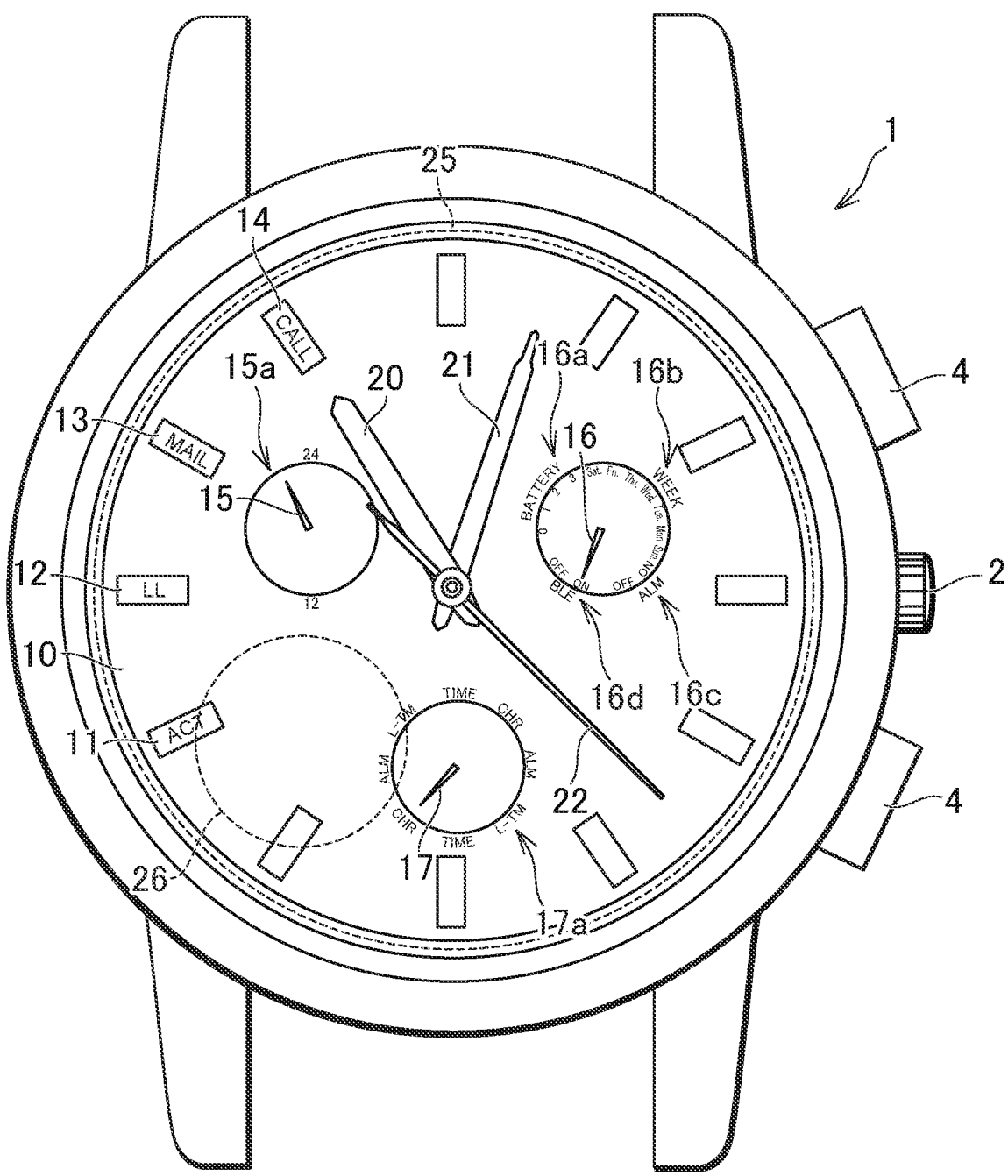
FIG. 1 is a plan view for illustrating an example of the outer appearance of an electronic wristwatch according to an embodiment of the present invention.

FIG. 1 is a plan view for illustrating an example of the outer appearance of an electronic wristwatch 1 in the embodiment of the present invention. The electronic wristwatch 1 in this embodiment has the outer appearance of a so-called analog clock, and performs short-range wireless communication to/from a mobile terminal 30 being a computer. A communication circuit and an antenna for performing the short-range wireless communication is housed in a case body being an exterior (watch case). A standard for the short-range wireless communication is not particularly limited, and any known standards may be employed. The electronic wristwatch 1 includes a crown 2 and push buttons 4, which are used for the time adjustment of time hands and for use of a function.

The electronic wristwatch 1 includes a dial face 10 in the case body being an exterior (watch case). The electronic wristwatch 1 includes, on the dial face 10, a connection processing indication 11 for indicating that the electronic wristwatch 1 is performing processing for establishing a connection to the mobile terminal 30, a link loss indication 12 for indicating that the connection to the mobile terminal 30 has been disconnected, an electronic mail reception indication 13 for notifying that the mobile terminal 30 has received an electronic mail, and an incoming telephone call indication 14 for notifying that the mobile terminal 30 has received an incoming telephone call. The electronic wristwatch 1 points any one of the connection processing indication 11, the link loss indication 12, the electronic mail reception indication 13, and the incoming telephone call indication 14 with a second hand 22 described later, to thereby present each corresponding piece of information to a user.

The electronic wristwatch 1 includes a first secondary hand 15, and includes a 24-hour indication 15a for indicating the current time in a 24-hour clock by the first secondary hand 15. The electronic wristwatch 1 further includes a second secondary hand 16, and includes a remaining charge amount indication 16a for indicating the remaining charge amount of a secondary battery in four steps of "0" to "3" by the second secondary hand 16, a day-of-the-week indication 16b for indicating the current day of the week as any one of "Sun." to "Sat." by the second secondary hand 16, an alarm setting indication 16c for indicating the setting of an alarm function as "ON" or "OFF" by the second secondary hand 16, and a connected state indication 16d for indicating the connected state with respect to the mobile terminal 30 via the short-range wireless communication as "ON" or "OFF" by the second secondary hand 16. The electronic wristwatch 1 further includes a third secondary hand 17, and includes a function setting indication 17a for indicating that a current time display function is set by pointing "TME" with the third secondary hand 17, indicating that a chronograph function is set by pointing "CHR" with the third secondary hand 17, indicating that the alarm function is in a set state by pointing "ALM" with the third secondary hand 17, and indicating that a local time display function is set by pointing "L-TM" with the third secondary hand 17.

The electronic wristwatch 1 includes a plurality of time hands driven by a motive power source. Specifically, the electronic wristwatch 1 includes an hour hand 20, a minute hand 21, and the second hand 22, which are driven by a stepping motor, as the time hands. It is to be understood that the electronic wristwatch 1 may include any hand other than those described above as the time hand. The time hand is any analog indication member for pointing the time, typical examples of which include a hand, but as special examples, a rotating disc and a retrograde hand can also be included in the time hands.

The electronic wristwatch 1 has the case body mounted with a windshield formed of glass or other such transparent material so as to cover the dial face 10. The electronic wristwatch 1 also has the case body mounted with a case back on the opposite side of the windshield. In the present application, a direction of the electronic wristwatch 1 in which the windshield is arranged (front direction of the drawing sheet in FIG. 1) is hereinafter referred to as "front side", and a direction thereof in which the case back is arranged (depth direction of the drawing sheet in FIG. 1) is referred to as "a back side".

The electronic wristwatch 1 includes a solar battery 25 serving as a power generator. The solar battery 25 is arranged on the back side of the dial face 10, and generates power from light entering from the front side. Therefore, the dial face 10 is formed of a material that transmits a light beam to some extent. The electronic wristwatch 1 further includes a secondary battery 26 to be charged with electric power generated by the power generator. The electronic wristwatch 1 uses the electric power stored in the secondary battery 26 to control and drive all the members including the hour hand 20. The electronic wristwatch 1 in this embodiment includes the solar battery 25 as a power generator, but an embodiment mode of the power generator is not limited thereto. For example, the power generator may be a mechanical one, may be one configured to generate power by having a power supply voltage applied from the outside, or may be one configured to generate power by electromagnetic induction.

The design of the electronic wristwatch 1 illustrated in FIG. 1 is merely an example. In addition to the design illustrated here, for example, the case body may be set to have a rectangular shape instead of a circular shape, and the presence or absence, number, and layout of the crown 2 and the push buttons 4 are freely set. In this embodiment, there are provided a total of six hands, namely, the hour hand 20, the minute hand 21, the second hand 22, the first secondary hand 15, the second secondary hand 16, and the third secondary hand 17, but the present invention is not limited thereto, and a hand for performing each of different kinds of indications may be added or deleted.

Figure 2:
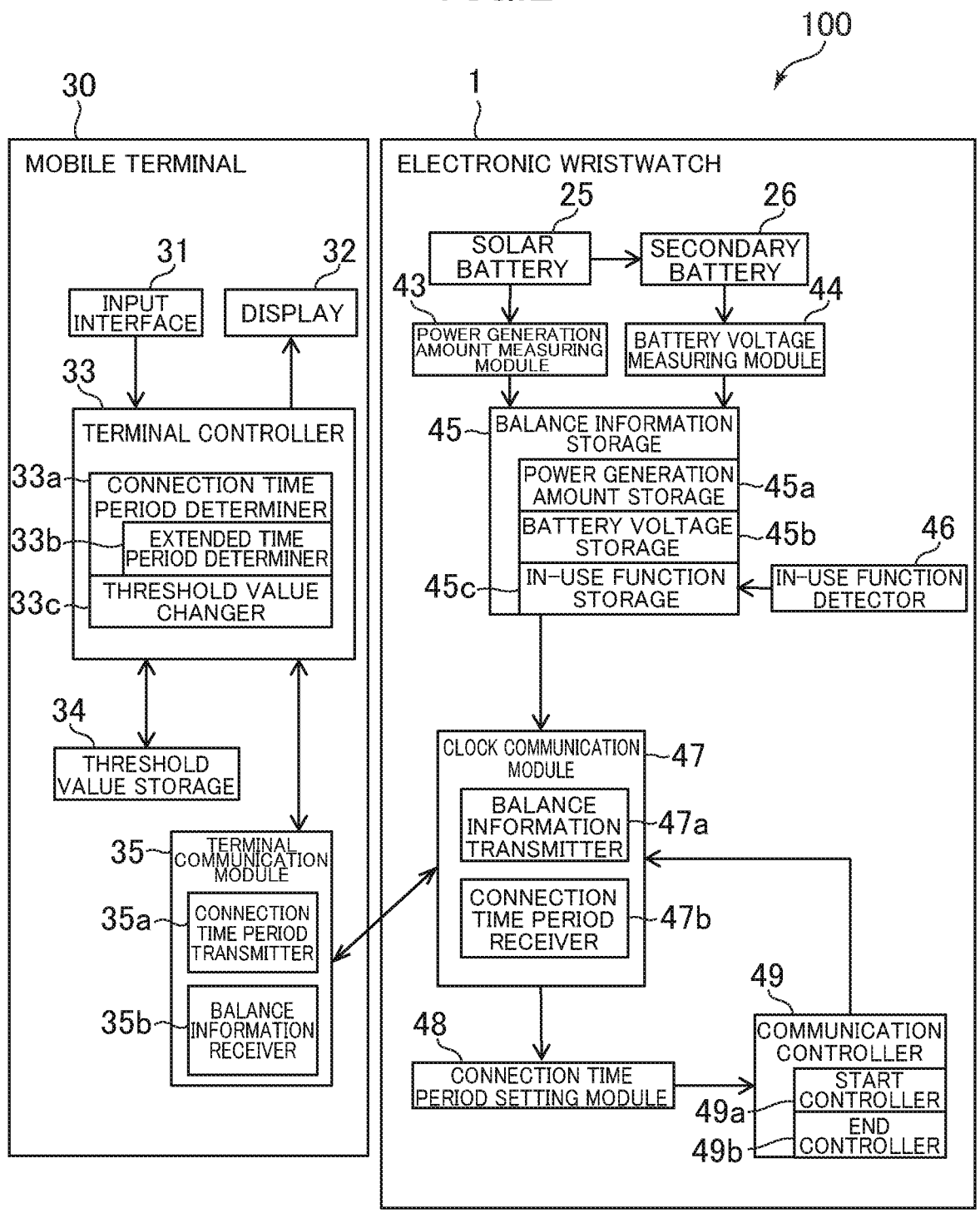
FIG. 2 is a functional block diagram of a communication control system according to the embodiment of the present invention.

FIG. 2 is a functional block diagram of a communication control system 100 according to the first embodiment of the present invention. The communication control system 100 includes the mobile terminal 30 and the electronic wristwatch 1, and is a system configured to control communication between the mobile terminal 30 and the electronic wristwatch 1.

The mobile terminal 30 being a computer includes an input interface 31, a display 32, a terminal controller 33, a threshold value storage 34, and a terminal communication module 35. The mobile terminal 30 is a portable computer, for example, a smartphone. The input interface 31 is configured to receive an operation performed by the user of the mobile terminal 30 and to give input to the terminal controller 33 of the mobile terminal 30, and is, for example, a touch panel. The display 32 is configured to present various kinds of information to the user, and is, for example, a liquid crystal display device.

The terminal controller 33 includes a central processing unit (CPU), and controls the entire mobile terminal 30. The terminal controller 33 includes a connection time period determiner 33a and a threshold value changer 33c. The connection time period determiner 33a determines a connection time period of a connection with the electronic wristwatch 1 to be performed by the terminal communication module 35 based on the charging balance of the secondary battery 26 of the electronic wristwatch 1. In this case, the connection time period refers to a time period during which the connected state via the short-range wireless communication is maintained between the terminal communication module 35 and a clock communication module 47. The connection time period determiner 33a includes an extended time period determiner 33b. The extended time period determiner 33b determines an extended time period to be added to the connection time period based on balance information. The threshold value changer 33c changes a threshold value for determining the connection time period. The changing of the threshold value is made based on input performed by the user through the input interface 31. The connection time period determiner 33a and the extended time period determiner 33b determine the connection time period and the extended time period, respectively, by analyzing the balance information acquired from the mobile terminal 30, calculating an index value relating to the transition of a power generation amount or the charging balance, and then comparing the index value with the threshold value. In this case, the power generation amount refers to an amount of electric power generated by the solar battery 25, and the charging balance refers to a difference between the power generation amount and the consumption amount of the electric power, namely, an amount of charge accumulated in the secondary battery 26 or an amount of charge accumulated in the secondary battery 26 per unit time. The power generation amount may be determined based on a value obtained by actually measuring the power generation amount generated by the solar battery 25. The consumption amount may be determined based on a value obtained by actually measuring the power consumption of the stepping motor configured to drive the hour hand 20 or the like, or may be determined by referring to average power consumption relating to the operational state of the electronic wristwatch 1 based on the operational state.

The threshold value storage 34 stores the threshold value for determining the connection time period. The threshold value may be set for each of different extended time periods, and the threshold value storage 34 may store a plurality of threshold values. When the threshold value is changed by the threshold value changer 33c, the threshold value stored in the threshold value storage 34 is updated.

The terminal communication module 35 performs the short-range wireless communication to/from the clock communication module 47 of the electronic wristwatch 1. The terminal communication module 35 includes a connection time period transmitter 35a and a balance information receiver 35b. The connection time period transmitter 35a transmits the connection time period, which is determined by the connection time period determiner 33a, and the extended time period, which is determined by the extended time period determiner 33b and is to be added to the connection time period, to the electronic wristwatch 1. The balance information receiver 35b receives, from the electronic wristwatch 1, the balance information relating to the transition of the power generation amount or the charging balance of the secondary battery. The balance information refers to information sufficient for obtaining the power generation amount or the charging balance regarding a predetermined period. For example, the power generation amount is itself the balance information, and transitions of the power generation amount and the consumption amount during a given period are the balance information. In addition, the transitions of the power generation amount of the solar battery 25 and the battery voltage of the secondary battery 26 during a given period are the balance information. The following description is given on the assumption that the balance information is the information sufficient for obtaining the charging balance of the secondary battery 26.

The electronic wristwatch 1 includes the solar battery 25, the secondary battery 26, a power generation amount measuring module 43, a battery voltage measuring module 44, a balance information storage 45, an in-use function detector 46, the clock communication module 47, the connection time period setting module 48, and the communication controller 49. The power generation amount measuring module 43 measures the electric power generated by the solar battery 25. For example, the power generation amount measuring module 43 measures the electric power generated by the solar battery 25 every five minutes. The battery voltage measuring module 44 measures the voltage of the secondary battery 26. The battery voltage measuring module 44 may measure the voltage of the secondary battery 26 at the same interval as that used in the measurement by the power generation amount measuring module 43. For example, the battery voltage measuring module 44 measures the voltage of the secondary battery 26 every five minutes. The in-use function detector 46 detects a function of the electronic wristwatch 1 being used by the user. The electronic wristwatch 1 in this embodiment has the current time display function using the hour hand 20, the minute hand 21, and the second hand 22, the chronograph function using the first secondary hand 15, the alarm function using an alarm built into the case body, a vibration function using a vibrator built into the case body, and a short-range wireless communication function using the clock communication module 47. In addition, the electronic wristwatch 1 may have a backlight function, a positioning function involving receiving a satellite radio wave, a time measuring function involving receiving a satellite radio wave, and a time measuring function involving receiving a standard radio wave.

The balance information storage 45 stores the balance information relating to the transition of the power generation amount or the charging balance. The balance information storage 45 includes a power generation amount storage 45a, a battery voltage storage 45b, and an in-use function storage 45c. The power generation amount storage 45a stores the transition of the electric power generated by the solar battery 25, which is measured by the power generation amount measuring module 43. The battery voltage storage 45b stores the transition of the voltage of the secondary battery 26, which is measured by the battery voltage measuring module 44. The in-use function storage 45c stores the transition of the function of the electronic wristwatch 1 being used by the user, which is detected by the in-use function detector 46. The information stored in the balance information storage 45 is described in detail with reference to the subsequent figure.

The clock communication module 47 performs the short-range wireless communication to/from the terminal communication module 35 of the mobile terminal 30. The clock communication module 47 includes a balance information transmitter 47a and a connection time period receiver 47b. The balance information transmitter 47a transmits the balance information relating to the transition of the power generation amount or the charging balance to the mobile terminal 30 being a computer. The connection time period receiver 47b receives the connection time period determined by the mobile terminal 30 being a computer.

The connection time period setting module 48 sets the connection time period of the connection to the mobile terminal 30 being a computer based on the balance information. The communication controller 49 controls a start and an end of communication to/from the mobile terminal 30 being a computer based on the connection time period set by the connection time period setting module 48. The connection between an electronic clock and a computer via the short-range wireless communication consumes a relatively large amount of electric power stored in the secondary battery 26, and hence in order to prevent the battery voltage of the secondary battery 26 from becoming too low, a timing to disconnect the connection is uniformly set in advance in some cases. However, a manner of using the electronic clock varies depending on the user, and in some cases, the battery voltage of the secondary battery 26 sufficiently remains even after the connection between the electronic clock and the computer is maintained for a time period set in advance. In such a case, the connection between the electronic clock and the computer is released at a timing not intended by the user, which may impair the convenience of the user. According to the electronic wristwatch 1 in this embodiment, the start and the end of the communication to/from the computer is controlled based on the connection time period set in accordance with the transition of the balance information, and hence the connection is flexibly performed, which improves the convenience of the user.

Further, with the communication control system 100 according to this embodiment, the log of the balance information is acquired by the electronic wristwatch 1, and is transmitted to the mobile terminal 30, while the connection time period is determined by the mobile terminal 30. The mobile terminal 30 has abundant hardware resources as compared with the electronic wristwatch 1, and can employ a more advanced and flexible method when the connection time period is determined. Therefore, the connection between the electronic clock and the computer is controlled more flexibly.

FIG. 3 is a table for showing an example of balance information 45d stored in the balance information storage 45. The electronic wristwatch 1 stores the power generation amount, the battery voltage, and the in-use function, which are included in the balance information, at a first interval for a first period, and stores the power generation amount, the battery voltage, and the in-use function at a second interval, which is longer than the first interval, for a second period, which is longer than the first period. In this case, the power generation amount and the battery voltage stored for the second period may be average values of the power generation amounts and the battery voltages stored at the first interval, which are obtained at the second interval. Further, the balance information storage 45 avoids storing the power generation amount, the battery voltage, and the in-use function, which are obtained before the second period. Specifically, the balance information storage 45 stores the power generation amount, the battery voltage, and the in-use function at five-minute intervals for a period of the last one day, and stores the power generation amount, the battery voltage, and the in-use function at one-hour intervals for a period from seven days before to one day before. The average values of the power generation amounts and the battery voltages stored at the five-minute intervals are stored at one-hour intervals for the period from seven days before to one day before. Further, the balance information storage 45 avoids storing the power generation amount, the battery voltage, and the in-use function, which are obtained earlier than eight days before.

The balance information 45d includes pieces of information relating to a date, a time, a power generation amount, a battery voltage, and an in-use function. In the example illustrated in FIG. 3, "11/2" to "11/8" (November 2 to November 8) are stored as the dates. The balance information is stored for each date, and the most recent piece of information is on November 8. Charging balance information on November 8 is stored every five minutes. The piece of information at "23:50" reads that the power generation amount is P1 (μW), the battery voltage is V1 (V), and the in-use function is current time display. The piece of information at "23:45" reads that the power generation amount is P2 (μW), the battery voltage is V2 (V), and the in-use function is the current time display. The piece of information at "23:40" reads that the power generation amount is P3 (μW), the battery voltage is V3 (V), and the in-use function is the current time display and mail notification. The piece of information at "0:00" reads that the power generation amount is P4 (μW), the battery voltage is V4 (V), and the in-use function is the current time display. In this case, the current time display function refers to a function of displaying the current time through use of the hour hand 20, the minute hand 21, and the secondhand 22. The mail notification function refers to a function of notifying the user that the mobile terminal 30 has received an electronic mail by generating sound with the alarm built into the case body or generating vibrations with the vibrator.

Balance information on November 7 is stored every hour. The piece of information at "23:00" reads that the power generation amount is P5 (μW), the battery voltage is V5 (V), and the in-use function is current time display. The piece of information at "22:00" reads that the power generation amount is P6 (μW), the battery voltage is V6 (V), and the in-use function is the current time display and an alarm function. The piece of information at "1:00" reads that the power generation amount is P7 (μW), the battery voltage is V7 (V), and the in-use function is the current time display. The piece of information at "0:00" reads that the power generation amount is P8 (μW), the battery voltage is V8 (V), and the in-use function is the current time display. In this case, the alarm function refers to a function of generating sound with the alarm built into the case body at a time set in advance.

The pieces of balance information from the balance information on November 6 to the balance information on November 2 being the information on seven days before are also stored at one-hour intervals. According to the balance information on November 6, the piece of information at "23:00" reads that the power generation amount is P9 (μW), the battery voltage is V9 (V), and the in-use function is the current time display. According to the balance information on November 2, the piece of information at "0:00" reads that the power generation amount is P10 (μW), the battery voltage is V10 (V), and the in-use function is the current time display.

According to the electronic wristwatch 1 in this embodiment, which includes the balance information storage 45, even when the connection between the electronic clock and the computer is interrupted or when anew computer is introduced, the information relating to the uninterrupted transition of the power generation amount or the charging balance is obtained, and the control of the connection time period conforming to the current situation is performed. Further, by storing the balance information at the first interval for the first period and storing the balance information at the second interval, which is longer than the first interval, for the second period, which is longer than the first period, it is possible to store the balance information for a long period with a relatively small storage amount, to thereby be able to determine the connection time period that reflects the actual use state of the user. Further, the balance information storage 45 avoids storing the balance information obtained before the second period, to thereby be able to sequentially erase the balance information stored in the past and to store new pieces of balance information, which enables a relatively small storage amount to be utilized effectively.

The balance information storage 45 may be configured to store the power generation amount measured by the power generation amount measuring module 43 and the in-use function detected by the in-use function detector 46, and the balance information transmitter 47a may be configured to transmit the information relating to the transition of the power generation amount and the function in use to the mobile terminal 30 being a computer. The mobile terminal 30 may calculate the power consumption of the electronic wristwatch 1 based on the received transition of the in-use function and with reference to a correspondence relationship between the in-use function and the power consumption, which is stored in advance, and calculate a balance with the received power generation amount, to thereby calculate the transition of the charging balance of the secondary battery 26. According to the electronic wristwatch 1 in this embodiment, the connection time period is determined based on the use status of the electronic wristwatch 1, and the connection time period in which the behavior pattern of the user is reflected is set. When the power generation amount is simply used as the balance information, the configuration may omit the battery voltage storage 45b and the in-use function storage 45c of the balance information storage 45 as well as the in-use function detector 46.

The mobile terminal 30 receives input of a start time of communication from the user through the input interface 31, and transmits the received start time to the electronic wristwatch 1. A start controller 49a included in the communication controller 49 starts communication to/from the computer at a start time set in advance. Meanwhile, an end controller 49b ends the communication to/from the computer at an end time being a time at which the connection time period has elapsed from the start time. According to the electronic wristwatch 1 in this embodiment, the connection between the electronic clock and the computer can be started at the time suitable for the life rhythm of the user, and is maintained during a time slot in which the electronic clock and the computer are used frequently, which improves the convenience of the user. Further, the connection is ended after the lapse of the connection time period set based on the actual use state of the user, and it is possible to appropriately control the connection between the computer and the electronic clock for each user. In another case, in addition thereto, a communication connection to the electronic wristwatch 1 may be started by the terminal communication module 35 based on input performed through the input interface 31 of the mobile terminal 30.

Figure 4:
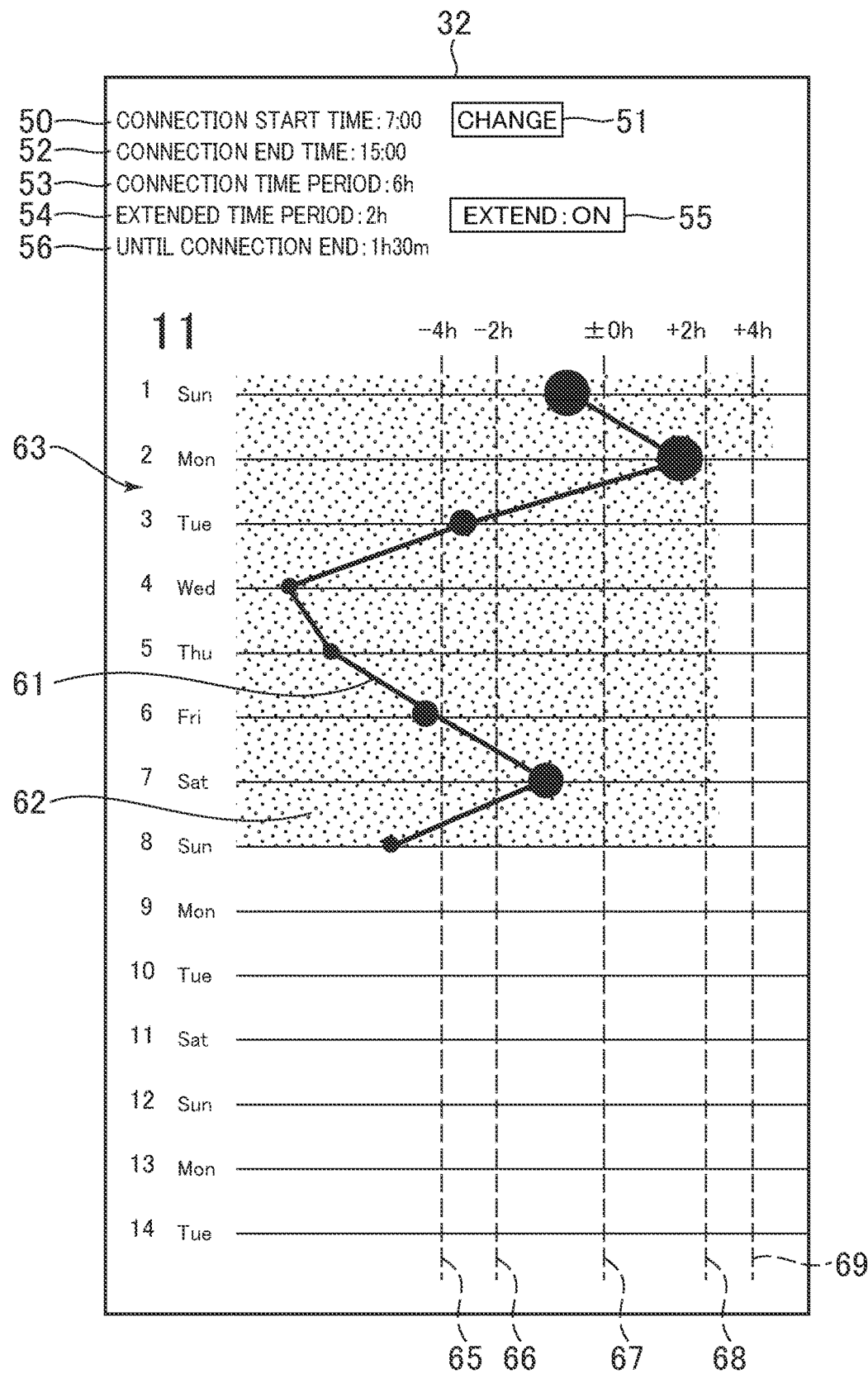
FIG. 4 is a graph for showing an example of the transition of a charging balance, a connection time period, and other such information to be displayed by a display of a mobile terminal in the embodiment of the present invention.

FIG. 4 is a graph for showing an example of the transition of the charging balance, the connection time period, and other such information to be displayed by the display 32 of the mobile terminal 30 in the embodiment of the present invention. A display screen in this example includes a connection start time 50, a change button 51, a connection end time 52, an extended time period 54, an extend button 55, a connection end advance notice 56, a month/day display 60, and pieces of information displayed in a graph display area 63 including a line graph 61 for indicating the transition of the charging balance for each day, a bar chart 62 for indicating the transition of the charging balance for each week, a first threshold value 65, a second threshold value 66, a third threshold value 67, a fourth threshold value 68, and a fifth threshold value 69. When the power generation amount is simply used as the balance information, the bar chart 62 is used for indicating the transition of the power generation amount.

The connection start time 50 is a time at which the connection between the electronic wristwatch 1 and the mobile terminal 30 is started by the start controller 49a, and is represented by "7:00" in this example, which reads that the connection is started at 7 a.m. The change button 51 is a button for changing the connection start time 50, and enables the editing of the connection start time 50 by being touched. The user is allowed to set the connection start time 50 suitable for his/her own life rhythm.

The connection end time 52 is a time at which the connection between the electronic wristwatch 1 and the mobile terminal 30 is ended by the end controller 49b, and is represented by "15:00" in this example, which reads that the connection is to be ended at 3 p.m. The connection end time 52 is a time at which a connection time period 53 and the extended time period 54 added thereto have elapsed from the connection start time 50.

The connection time period 53 is a time period for maintaining the connection between the electronic wristwatch 1 and the mobile terminal 30, which is determined by the connection time period determiner 33a, and is represented by "6 h" in this example, which reads that the connection time period is six hours. The extended time period 54 is a time period to be added to the connection time period determined by the extended time period determiner 33b, and is represented by "2 h" in this example, which reads that the extended time period is two hours. The extend button 55 is a button for indicating whether or not to add the extended time period 54 to the connection time period 53, and enables, by being touched, the selection of whether or not the extended time period 54 is to be added to the connection time period 53. In this example, the extend button 55 is represented by "ON", which reads that the connection time period 53 is to be added to the extended time period 54. In the case of this example, a total connection time period is eight hours.

The connection end advance notice 56 is a time period from the current time until the connection time period end time, and is represented by "1 h 30 m" in this example, which reads that the time period until the end of the connection is one hour and a half.

The month/day display 60 represents the date on which the charging balance information being displayed is acquired. The character "11" displayed at the top indicates that information obtained in November is being displayed, and the characters "1 Sun" to "14 Tue" indicate that pieces of information obtained during a period from November 1 (Sunday) to November 14 (Tuesday) are being displayed.

The line graph 61 for indicating the transition of the charging balance for each day is obtained by plotting the average value of the index values of the charging balance for each day. As the average value of the index values becomes larger, a plotted dot thereof is displayed in a larger size, which allows the charging balance on that day to be intuitively grasped.

The bar chart 62 for indicating the transition of the charging balance for each week represents the average value of the index values of the charging balance for each week. The bar chart 62 in this example exhibits different values between a period until November 1 and a period from November 2 until November 8, which reads that the average value of the charging balances for the period until November 1 is larger than the average value of the charging balances for the period from. November 2 until November 8.

The display 32 presents the first threshold value 65, the second threshold value 66, the third threshold value 67, the fourth threshold value 68, and the fifth threshold value 69 in addition to the transition of the charging balance. Each of the threshold values is a value to be compared with the index value of the charging balance by the connection time period determiner 33a and the extended time period determiner 33b, and is a value to be a reference for determining the connection time period and the extended time period. The connection time period determiner 33a and the extended time period determiner 33b of the mobile terminal 30 in this embodiment compare the bar chart 62 for indicating the transition of the charging balance for each week with the respective threshold values to determine each of the connection time period and the extended time period. Specifically, when the height of the bar chart 62 is smaller than the first threshold value 65, the connection time period is determined as two hours and the extended time period is determined as zero hours. Further, when the height of the bar chart 62 is equal to or larger than the first threshold value 65 and smaller than the second threshold value 66, the connection time period is determined as four hours and the extended time period is determined as zero hours. Further, when the height of the bar chart 62 is equal to or larger than the second threshold value 66 and smaller than the third threshold value 67, the connection time period is determined as six hours and the extended time period is determined as zero hours. Further, when the height of the bar chart 62 is equal to or larger than the third threshold value 67 and smaller than the fourth threshold value 68, the connection time period is determined as six hours and the extended time period is determined as zero hours. Further, when the height of the bar chart 62 is equal to or larger than the fourth threshold value 68 and smaller than the fifth threshold value 69, the connection time period is determined as six hours and the extended time period is determined as two hours. Further, when the height of the bar chart 62 is equal to or larger than the fifth threshold value 69, the connection time period is determined as six hours and the extended time period is determined as four hours. In the case of this example, the bar chart 62 for the period until November 1, which has the height equal to or larger than the fifth threshold value 69, reads that the connection time period is six hours and the extended time period is four hours. Meanwhile, the bar chart 62 for the period from November 2 until November 8, which has the height equal to or larger than the fourth threshold value 68 and smaller than the fifth threshold value 69, reads that the connection time period is six hours and the extended time period is two hours.

When the index value of the charging balance is small and the height of the bar chart 62 is smaller than the first threshold value 65 or the second threshold value 66, the extended time period is set to zero hours with the connection time period being set to two hours or four hours, respectively, in the above-mentioned example. However, in order to explicitly present that the charging balance is insufficient to the user, the connection time period may be set to six hours or other such fixed value, and a shortened time period may be displayed instead of the extended time period. That is, when the height of the bar chart 62 is smaller than the first threshold value 65, for example, the wording "connection time period: six hours; shortened time period: four hours" or other such information may be displayed. In this case, it is explicitly presented that the connection time period corresponding to four hours is shortened due to an insufficient charging balance, while an originally connectable time period is six hours, which motivates the user to be encouraged to further charge the electronic wristwatch 1 by applying light thereto.

In the above description, it is selected whether or not the extended time period 54 is to be added to the connection time period 53 by touching the extend button 55. However, a desired extended time period 54 may be added by touching the indication of an extended time period displayed in each of the upper parts of the first to fifth threshold values 65 to 69, which are illustrated in the graph display area 63, for example, the indication of "+2 h" in the exemplary case of the fourth threshold value 68. In that case, the indication of the extended time period 54 may represent an extended time period set by the operation of the user instead of representing a time period available as the extended time period.

According to the mobile terminal 30 in this embodiment, the bar chart 62 for indicating the transition of the charging balance for each week is compared with a plurality of threshold values to determine the connection time period and the extended time period, to thereby set the connection time period in which the life rhythm of the user grasped in units of weeks is reflected. With this, the connection time period is determined irrespective of variations in units of several hours, variations in units of several days, or other such relatively fine variations of the charging balance, and the control of the connection time period is stabilized.

Figure 5:
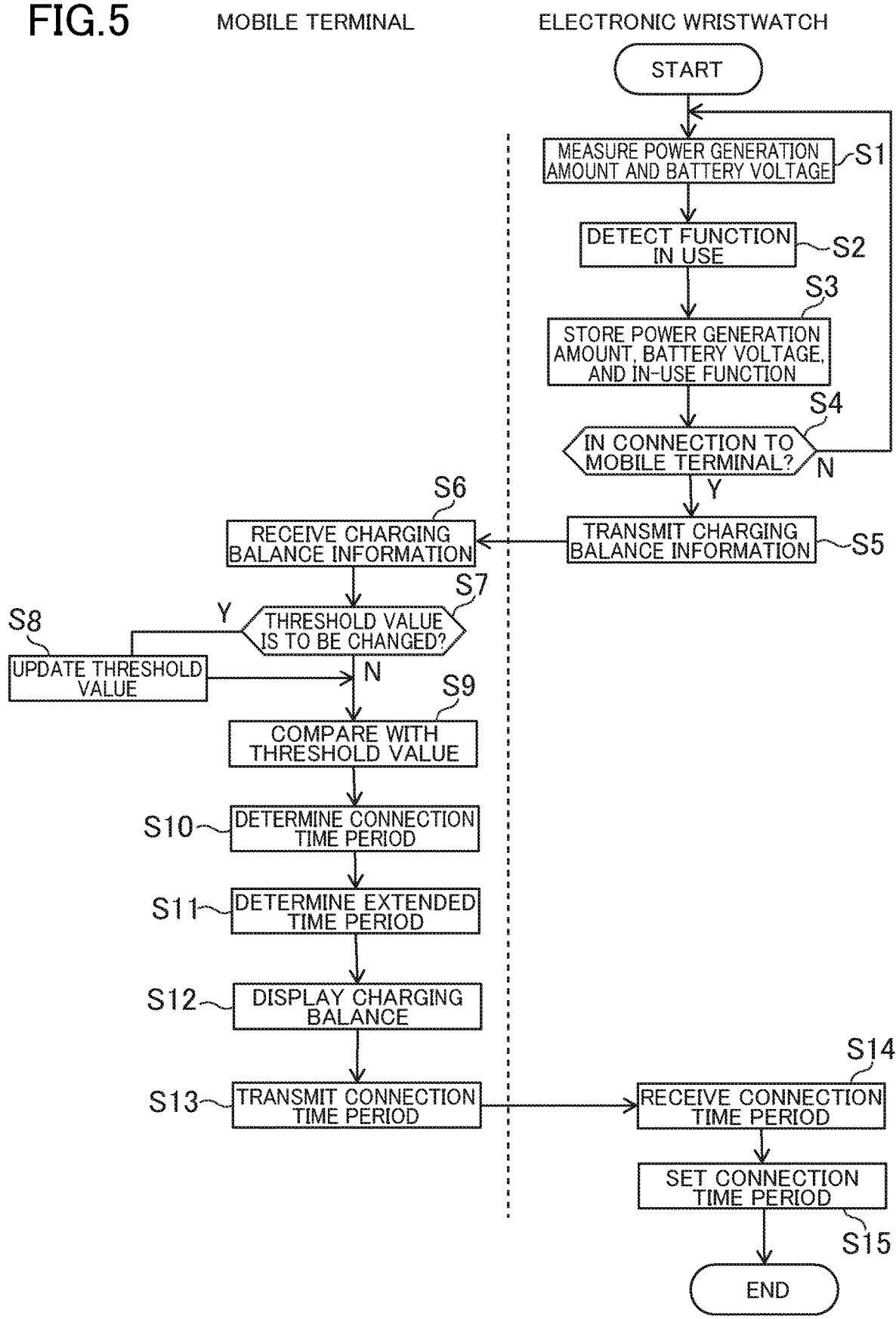
FIG. 5 is a flow chart for illustrating the setting of the connection time period performed in the communication control system according to the embodiment of the present invention.

FIG. 5 is a flow chart for illustrating the setting of the connection time period performed in the communication control system 100 according to the embodiment of the present invention. The electronic wristwatch 1 causes the power generation amount measuring module 43 to measure the power generation amount of the power generated by the solar battery 25, and causes the battery voltage measuring module 44 to measure the battery voltage of the secondary battery 26 (Step S1). In addition, the in-use function detector 46 is caused to detect the function in use (Step S2). The measurement of the power generation amount and the battery voltage and the detection of the in-use function are performed periodically, for example, every five minutes. The measured power generation amount is stored in the power generation amount storage 45a, the measured battery voltage is stored in the battery voltage storage 45b, and the detected in-use function is stored in the in-use function storage 45c (Step S3).

When the electronic wristwatch 1 and the mobile terminal 30 are in a connected state via the short-range wireless communication (Step S4: Yes), the balance information relating to the transition of the power generation amount or the charging balance, which includes the measured power generation amount, the measured battery voltage, and the detected in-use function, is transmitted to the mobile terminal 30 (Step S5). The mobile terminal 30 causes the balance information receiver 35b to receive the relevant balance information (Step S6). Meanwhile, when the electronic wristwatch 1 and the mobile terminal 30 are not in a connected state via the short-range wireless communication (Step S4: No), the balance information is repeatedly stored periodically.

The mobile terminal 30 determines whether or not the threshold value has been changed by the threshold value changer 33c (Step S7), and when the threshold value has been changed, updates the threshold value stored in the threshold value storage 34 (Step S8). After that, the index value calculated based on the balance information is compared with the threshold value (Step S9). A plurality of threshold values may be set, and in that case, the comparison is performed as to which of the threshold values the index value is equal to or larger than and which of the threshold values the index value is smaller than.

The connection time period determiner 33a determines the connection time period based on a result of the comparison between the index value and the threshold value (Step S10). Further, the extended time period determiner 33b determines the extended time period to be added to the connection time period based on a result of the comparison between the index value and the threshold value (Step S11). It may be determined based on the input performed through the input interface 31 whether or not the extended time period is to be added to the connection time period.

The mobile terminal 30 displays the determined connection time period, the determined extended time period, the transition of the power generation amount or the charging balance based on the received balance information on the display 32 (Step S12). Further, the connection time period transmitter 35a is caused to transmit the determined connection time period and the determined extended time period to the electronic wristwatch 1 (Step S13).

The electronic wristwatch 1 causes the connection time period receiver 47b to receive the connection time period and the extended time period (Step S14). The connection time period setting module 48 sets the connection time period based on the received connection time period and the received extended time period (Step S15). The end controller 49b of the communication controller 49 ends the communication to/from the mobile terminal 30 based on the set connection time period.

Figure 6:
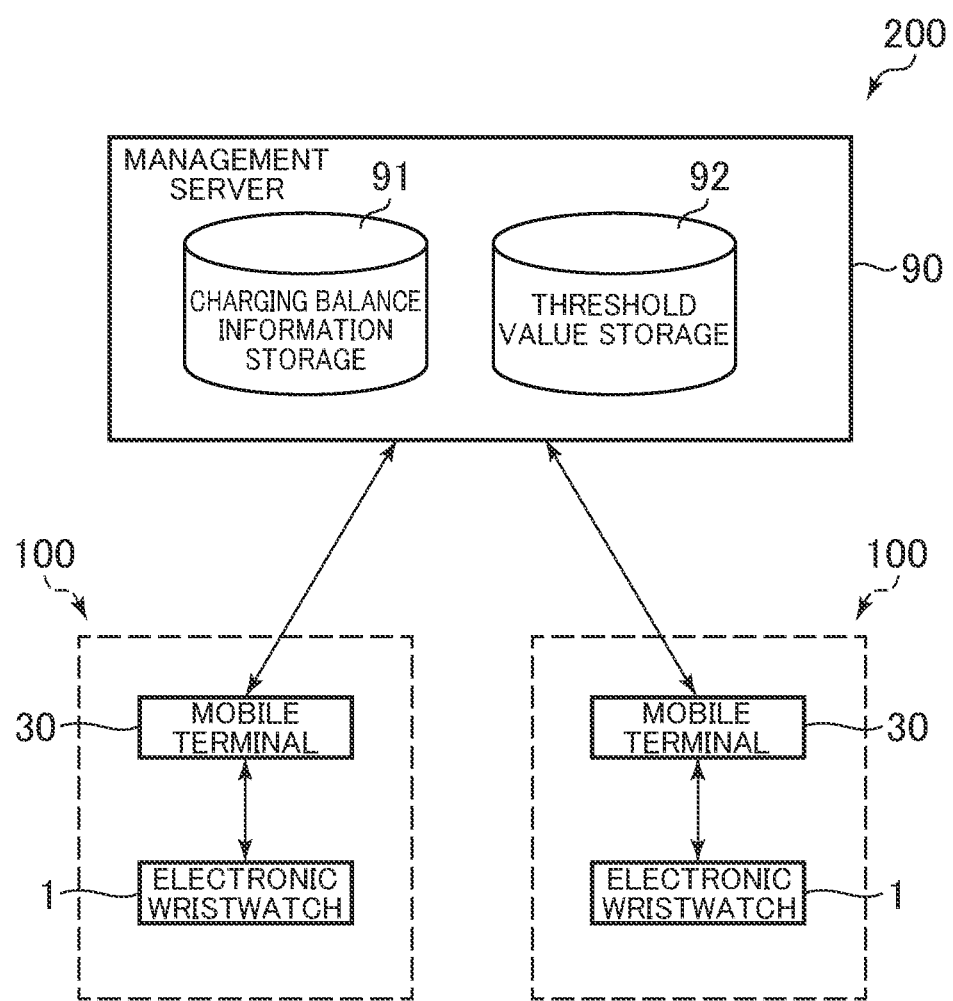
FIG. 6 is a functional block diagram of a communication management system in the embodiment of the present invention.

FIG. 6 is a functional block diagram relating to a communication management system 200 in the embodiment of the present invention. The communication management system 200 includes a management server 90 and a plurality of communication control systems 100. The communication management system 200 in this embodiment includes two communication control systems 100. It is to be understood that the communication management system 200 may include three communication control systems 100 or more. The communication control systems 100 each include the mobile terminal 30 and the electronic wristwatch 1. The plurality of communication control systems 100 may be used by different users, or may be used by the same user.

The mobile terminal 30 transmits the balance information received from the electronic wristwatch 1 to the management server 90 each time the balance information is received or periodically. The management server 90 stores the received balance information in a balance information storage 91 for each user. When the connection time period is determined by the connection time period determiner 33a, the mobile terminal 30 may refer to a balance information history of the same user stored in the balance information storage 91 of the management server 90. With this, even when the electronic wristwatch 1 or the mobile terminal 30 is replaced, the balance information is synchronized to allow any one of the mobile terminals 30 to analyze the balance information with accuracy, and appropriate control of the connection time period is performed. Further, when the connection time period is determined by the connection time period determiner 33a, the mobile terminal 30 may refer to the balance information histories of different users stored in the balance information storage 91 of the management server 90. With this, the balance information can be analyzed based on more information, and the connection time period is controlled more flexibly.

The mobile terminal 30 transmits the most recent threshold value to the management server 90 when a new threshold value is set or when the threshold value is changed by the threshold value changer 33c. The management server 90 stores the received threshold value in a threshold value storage 92 for each user. The mobile terminal 30 may refer to the threshold value for the same user stored in the threshold value storage 92 of the management server 90 when the connection time period determiner 33a is caused to compare the index value with the threshold value. With this, even when the electronic wristwatch 1 or the mobile terminal 30 is replaced, the threshold value is synchronized to allow any one of the mobile terminals 30 to analyze the balance information with accuracy, and appropriate control of the connection time period is performed. Further, the mobile terminal 30 may refer to the threshold values for different users stored in the threshold value storage 92 of the management server 90 when the connection time period determiner 33a is caused to compare the index value with the threshold value. With this, it is possible to determine the adequacy of the set threshold value, and to present information relating to the adequacy of the set threshold value to the user.

FIG. 7 is a functional block diagram relating to a modification example 210 of a communication management system in the embodiment of the present invention. The modification example 210 of the communication management system includes the management server 90 and the plurality of communication control systems 100. The modification example 210 of the communication management system in this embodiment includes two communication control systems 100. It is to be understood that the modification example 210 of the communication management system may include three communication control systems 100 or more. The respective communication control systems 100 include the mobile terminals 30 different from each other and a common electronic wristwatch 1. The plurality of communication control systems 100 may be used by the same user.

The mobile terminal 30 transmits the balance information received from the electronic wristwatch 1 to the management server 90 each time the balance information is received or periodically. The management server 90 stores the received balance information in the balance information storage 91 for each user. When the connection time period is determined by the connection time period determiner 33a, the mobile terminal 30 may refer to a balance information history of the same user stored in the balance information storage 91 of the management server 90. With this, even when one user uses a plurality of mobile terminals 30, the balance information is synchronized to allow any one of the mobile terminals 30 to analyze the balance information with accuracy, and appropriate control of the connection time period is performed.

The mobile terminal 30 transmits the most recent threshold value to the management server 90 when a new threshold value is set or when the threshold value is changed by the threshold value changer 33c. The management server 90 stores the received threshold value in the threshold value storage 92 for each user. The mobile terminal 30 may refer to the threshold value for the same user stored in the threshold value storage 92 of the management server 90 when the connection time period determiner 33*a* is caused to compare the index value with the threshold value. With this, even when one user uses a plurality of mobile terminals 30, the threshold value is synchronized to allow any one of the mobile terminals 30 to analyze the balance information with accuracy, and appropriate control of the connection time period is performed.

In addition, the communication control system 100 according to this embodiment may perform a temporary connection for connecting between the electronic wristwatch 1 and the mobile terminal 30 for only a short limited period of time. This is different from the above-mentioned connection continued for hours (hereinafter referred to as "continuous connection") in that when required information communication is ended after the connection between the electronic wristwatch 1 and the mobile terminal 30 is performed, the connection is immediately disconnected automatically. As described above, the continuous connection continues the connected state during the set time period, and during that time period, the required notification is transmitted from the mobile terminal 30 to the electronic wristwatch 1 as appropriate, in which connection modes of the two are different from each other.

The temporary connection to be performed by the communication control system 100 according to this embodiment aims to transmit time information from the mobile terminal 30 to the electronic wristwatch 1 for time correction and to transmit the balance information from the electronic wristwatch 1 to the mobile terminal 30. The two kinds of transmission are attempted once a day in order to maintain the accuracy in time of the electronic wristwatch 1 as well as in consideration of the convenience of setting the connection time period based on the balance information.

Figure 8:
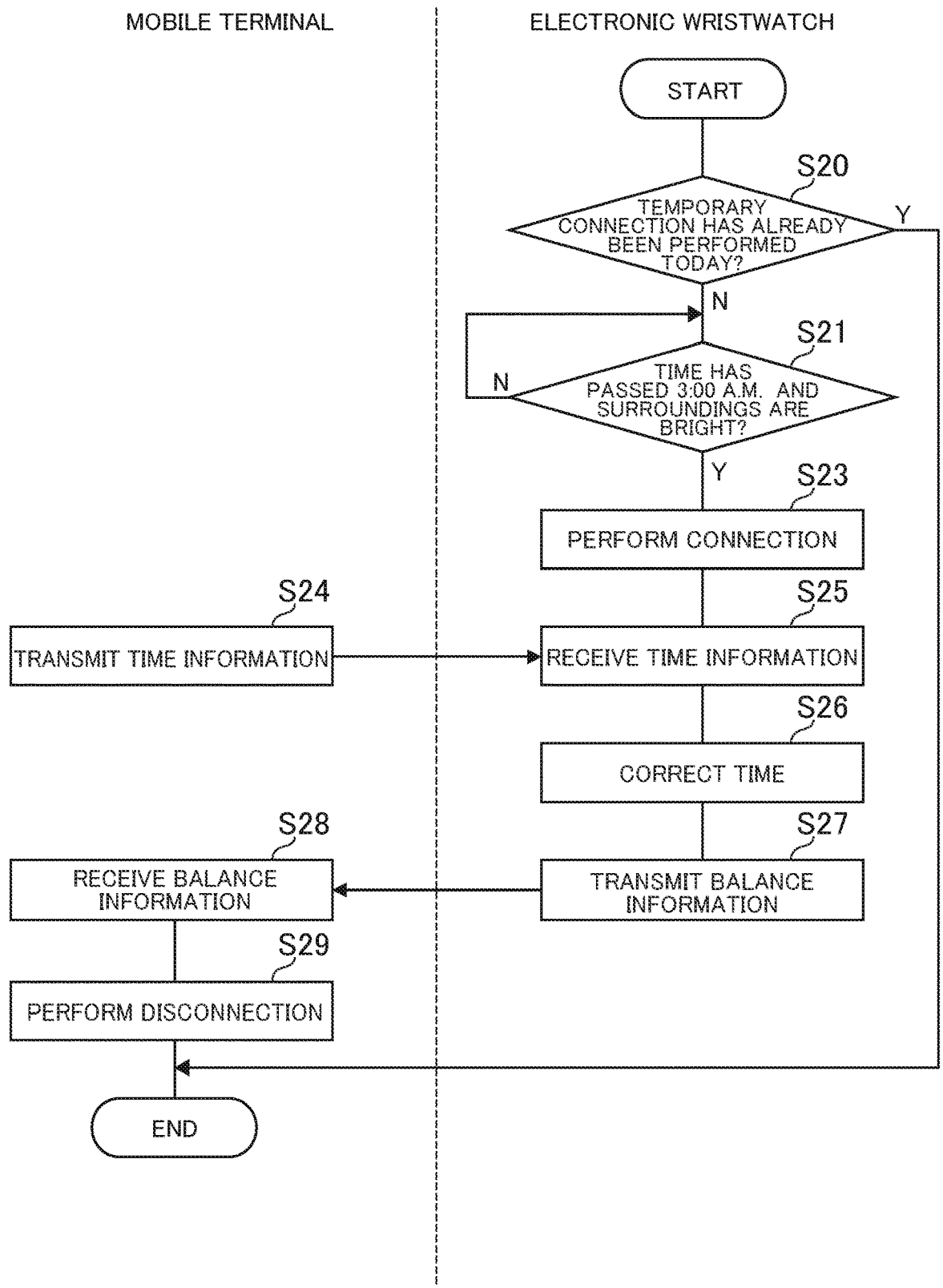
FIG. 8 is a flowchart for illustrating a flow for performing a temporary connection by the communication control system in the embodiment of the present invention.

FIG. 8 is a flowchart for illustrating a flow for performing the temporary connection by the communication control system 100 according to this embodiment. First, the electronic wristwatch 1 determines whether or not the temporary connection has already been performed today (Step S20). This determination uses one day (24 h) as a reference, and in this embodiment, a border between days is set to 0 a.m., but the border between days may be set to another time. When the temporary connection has already been performed (Step S20: Y), it is not required to perform the temporary connection again, and hence the communication control system 100 ends the flow without performing the connection.

When the temporary connection has not been performed (Step S20: N), the communication control system 100 further determines whether or not the time has passed a predetermined time and the surroundings of the electronic wristwatch 1 are bright (Step S21). In this embodiment, the predetermined time is set to 3:00 a.m. as an example. This is because it is desired that, at a time point before or when the user starts normal daily activities, the time of the electronic wristwatch 1 be accurately corrected or an appropriate connection time period and an appropriate extended time period be set based on the balance information stored until yesterday, and hence the predetermined time is thus set as a condition for detecting the time point before or when the user starts activities. That is, at the time point of 3:00 a.m., it is generally considered that the user has ended the activities of the day before, and it can be determined that a time point at which, after that, the electronic wristwatch 1 is taken out of a storage place or the surroundings become bright due to light from the outside is the time point before or when the user starts the activities, which is grounds for setting the predetermined time to 3:00 a.m.

When the time has not passed the predetermined time or the surroundings of the electronic wristwatch 1 are not bright (Step S21: N), Step S21 is repeatedly performed to wait until the condition is satisfied. This repetition may be performed at a predetermined time period, for example, every ten minutes.

When the predetermined time period has elapsed and the surroundings of the electronic wristwatch 1 are bright (Step S21: Y), the electronic wristwatch 1 performs the connection to the mobile terminal 30 (Step S23). After the connection, the mobile terminal 30 transmits the time information to the electronic wristwatch 1 (Step S24). The mobile terminal 30 acquires the time information from the outside, to thereby be able to keep accurate time. For example, the mobile terminal 30 accesses a time server on the web to acquire the accurate time.

The electronic wristwatch 1 receives the time information from the mobile terminal 30 (Step S25), and corrects the time (Step S26). With this, the electronic wristwatch 1 displays the accurate time. In addition, the electronic wristwatch 1 transmits the balance information obtained yesterday or until yesterday to the mobile terminal 30 (Step S27).

The mobile terminal 30 receives the balance information from the electronic wristwatch 1 (Step S28). The received balance information is used by the terminal controller 33 for causing the connection time period determiner 33*a* to determine the connection time period and causing the extended time period determiner 33*b* to determine the extended time period. After the balance information is received, the connection between the mobile terminal 30 and the electronic wristwatch 1 is disconnected (Step S29).

In this manner, the mobile terminal 30 and the electronic wristwatch 1 are connected to each other through use of the temporary connection to transmit or receive the time information and the balance information, to thereby allow the time to be corrected with accuracy and an appropriate connection time period and an appropriate extended time period to be set at the time point before or when the user starts the activities. Further, it suffices that the temporary connection is performed once a day, and it is not required to transmit or receive the balance information during the continuous connection, which can reduce a communication load during the continuous connection. It is to be understood that the balance information in progress may be transmitted or received during the continuous connection when the temporary connection fails or even when the temporary connection is successful.

The conditions for starting the temporary connection include a condition that the surroundings of the electronic wristwatch 1 are bright, and hence when a so-called power save mode of saving power consumption under a condition that the electronic wristwatch 1 is placed in a dark place is enabled, the power save mode is also canceled simultaneously with the temporary connection. In general, the power save mode refers to the state of saving power consumption by stopping a part of the functions of the electronic wristwatch 1, for example, the operation of the hands.

Further, the mobile terminal 30 in this embodiment may notify the user of a state relating to the continuous connection with the electronic wristwatch 1 by issuing various notifications (including warnings) to the user. Such notification is performed by the terminal controller 33 of FIG. 2 displaying the notifications on the display 32. In another case, when the electronic wristwatch 1 has an alarm or vibration function, simultaneously with the notification performed on the mobile terminal 30, a notification instruction may be transmitted from the terminal communication module 35 to the clock communication module 47 to cause the electronic wristwatch 1 to emit sound or vibrate, to thereby notify the user.

Various kinds of such notifications are conceivable. For example, it is possible to notify that the connection time period has expired when the continuous connection is disconnected with a lapse of time. Such notifications may be displayed at an appropriate position on the display 32 shown in FIG. 4, or when the mobile terminal 30 is a so-called smartphone or tablet terminal, may be displayed as a so-called system message at a position within an area reserved as a system display area. This display may be performed each time the continuous connection is disconnected, or in a case where a plurality of continuous connections are performed within one day, may be performed only when the first continuous connection is disconnected, while the display may be omitted when the subsequent continuous connections are disconnected.

In another case, it is possible to allow the user to set a target value of the power generation amount or the charging balance for a predetermined period, for example, one day or one week, and when the index value of the accumulated charging information fails to reach the target value set by the user, notify the user to be encouraged to generate power. By performing such notification, it is possible to encourage the user to positively perform charging by applying light to the electronic wristwatch 1, to thereby be able to extend the continuous connection time period, which improves the convenience of the user. In addition, a warning for encouraging the user to generate power in the same manner when the extended time period is reduced or the shortened time period is increased due to the insufficient power generation amount or charging balance.

Further, in the communication control system. 100 according to this embodiment, the duration may be caused to differ when the continuous connection is performed again after the expiration of the continuous connection within one day. That is, the duration of the first continuous connection within one day may be set to a predetermined long duration, and the duration of the second or subsequent continuous connection may be set short. In the example described with reference to FIG. 4, the duration is six hours, but the duration of the second or subsequent continuous connection within one day is shortened to, for example, three hours. In another case, in the second or subsequent continuous connection, the extended time period may be set as long as that of the first connection, but the extension may be inhibited (extended time period may be set to zero hours). This setting allows the user to connect the mobile terminal 30 and the electronic wristwatch 1 to each other as required even after the initial connection time period set based on the power generation amount or the charging balance has elapsed, which can suppress excessive power consumption. The user is further required to frequently operate reconnection in the second or subsequent continuous connection within one day, and is therefore made to recognize the importance of charging in the daily life in terms of a long-time connection.

In addition, the communication controller 49 of the electronic wristwatch 1 may be configured to switch between the permission and disapproval of the continuous connection and temporary connection depending on the remaining amount of the secondary battery 26. That is, both the continuous connection and the temporary connection may be permitted when the remaining amount of the secondary battery 26 is large, and when the remaining amount of the secondary battery 26 is small, only the temporary connection is permitted, while the continuous connection is inhibited.

More specifically, when the battery voltage measured by the battery voltage measuring module 44 is higher than a first battery voltage threshold value (for example, 2.4 V), the communication controller 49 does not impose any limitation on the connection, and both the continuous connection and the temporary connection are performed. When the battery voltage measured by the battery voltage measuring module 44 falls below the first battery voltage threshold value, the communication controller 49 permits only the temporary connection, and imposes a limitation on the continuous connection.

In this manner, when the remaining amount of the secondary battery 26 is small, the continuous connection exhibiting large power consumption is disabled to reduce the power consumption, to thereby delay a loss of a clock function due to the stop of the electronic wristwatch 1 itself. Meanwhile, the accuracy of time display is important to the clock function, and in order to inform the user of the status of the power generation amount or the charging balance and to encourage the user to actively perform charging, it is desired that the mobile terminal 30 grasp the balance information and the graph shown in FIG. 4 be presented to the user.

In view of this, when the remaining amount of the secondary battery 26 falls below the predetermined value, the electronic wristwatch 1 in this embodiment permits the temporary connection but disapproves the continuous connection, to thereby impose a limitation on the continuous connection while continuing the time correction performed by the electronic wristwatch 1 and the display of the balance information performed by the mobile terminal 30, to thereby suppress the power consumption. The mobile terminal 30 may issue a warning that the continuous connection has been disapproved to the user.

In addition, a second battery voltage threshold value (for example, 2.2 V) lower than the first battery voltage threshold value may be provided, and when the battery voltage falls below the second battery voltage threshold value, the communication controller 49 may disapprove the temporary connection in addition to the continuous connection. Under this state, no communication is performed between the mobile terminal 30 and the electronic wristwatch 1. A special warning of the electronic wristwatch 1, for example, movement of the second hand once every two seconds, is displayed to notify the user that the battery voltage has been considerably lowered and it is required to promptly perform charging.

Figure 9:
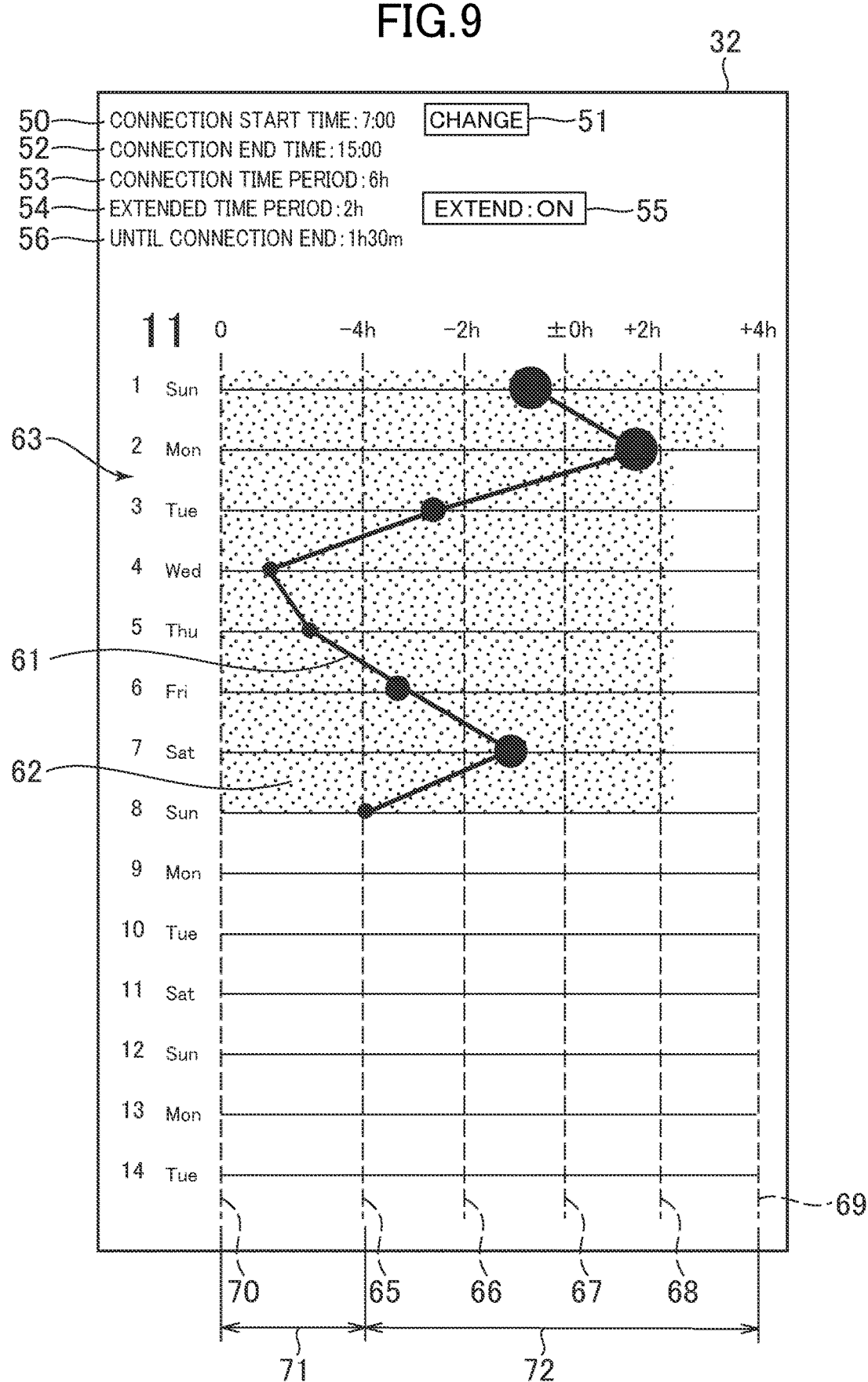
FIG. 9 is a modification example of a graph for showing an example of the transition of the charging balance, the connection time period, and other such information to be displayed by the display of the mobile terminal in the embodiment of the present invention.

Further, the display format of the graph display area 63 may be different. FIG. 9 is a modification example of a graph for showing an example of the transition of the charging balance, the connection time period, and other such information to be displayed by the display 32 of the mobile terminal 30 in the embodiment of the present invention.

In the example described above with reference to FIG. 4, the line graph 61 is obtained by plotting the plotted dots based on a fixed scale with the horizontal axis representing the charging balance (or power generation amount). The scale on the horizontal axis may be, for example, a scale having equal intervals between divisions or a logarithmic scale. In contrast, the example shown in FIG. 9 has a feature that the scale on the horizontal axis is not fixed.

In this case, the scale that is fixed means that intervals between the scale divisions on the axis are defined based on a fixed rule. For example, the equal interval scale is based on such a fixed rule that one scale division represents a fixed value. Further, the logarithmic scale is based on such a fixed rule that one scale division represents a value that changes in accordance with a logarithm. Meanwhile, the scale that is not fixed means that the intervals between the scale divisions on the axis are not defined based on a fixed rule, and includes, for example, a scale defined based on a plurality of different rules.

In the line graph 61 shown in FIG. 9, a segment 72 from the first threshold value 65 to the fifth threshold value 69 has an equal interval scale, and each of intervals between the scale division lines indicating the respective threshold values corresponds to two hours. With this, it is easy to understand and can be intuitively grasped what kind of influence the power generation amount or the charging balance, which is important information to the user, is to exert on the length of the extended time period or the shortened time period.

In contrast, a segment 71 from a reference axis 70 to the first threshold value 65, which is a segment below the first threshold value 65, has an equal interval scale in the same manner, but a width thereof is smaller than that of the segment 72, and intervals between the scale divisions are also smaller than those in the segment 72 from the first threshold value 65 to the fifth threshold value 69. That is, a slight difference in the power generation amount or the charging balance is clearly presented to the user when the power generation amount or the charging balance falls within the range from the first threshold value 65 to the fifth threshold value 69. Meanwhile, when the power generation amount or the charging balance falls below the first threshold value 65, the slight difference is not so largely presented, and a rough change in power generation amount or charging balance is merely read.

In this manner, different rules are used for the same graph displayed in the graph display area 63, and a scale that is not fixed is used, to thereby be able to enlarge apart that is important to the user so as to be displayed finely while displaying a rough tendency for a part that is not important to the user, which improves the convenience of the user.

In this modification example, the plotted dots displayed in the graph display area 63 are plotted in the equal interval scale based on the extended time period rather than the balance information. Therefore, it is easy for the user to grasp an influence to be exerted on the extended time period by a difference in power generation amount or charging balance. The balance information having values originally meant by the respective plotted dots is not necessarily linear with respect to the extended time period, and hence when the respective plotted dots are plotted in a fixed scale with respect to the balance information, the intervals between the scale division lines indicating the threshold values of the extended time period are not equally spaced as shown in FIG. 4.

Incidentally, as illustrated in FIG. 2, the electronic wristwatch 1 includes the balance information storage 45, and the balance information is stored. At this time, as described above, in order to effectively utilize relatively small storage amount of the electronic wristwatch 1, the balance information is stored at the first interval for the first period, and is stored at the second interval, which is longer than the first interval, for the second period, which is longer than the first period.

At this time, the resolution of a measured value measured by the power generation amount measuring module 43 or the battery voltage measuring module 44 is higher than the minimum resolution required for determining the connection time period or the extended time period on the mobile terminal 30. This is because some components used for the power generation amount measuring module 43 and the battery voltage measuring module 44 are commercially available general-purpose products, and there is a possibility that it may be difficult to freely determine the resolution or that a component having high quality and a high resolution may be used in a measurement section in order to ensure measurement accuracy.

In view of this, in order to reduce the information amount of the obtained measured value, the obtained measured value has the resolution reduced to compress the information amount when being stored in the balance information storage 45. At this time, the electronic wristwatch 1 in this embodiment uses an uneven rounding method when reducing the resolution.

Now, a description is given of the uneven rounding method. First, an even rounding method is described prior to the description of the uneven rounding method. The even rounding method refers to such a rounding method that the intervals between adjacent numerical values are equal when a numerical value having a large number of digits is rounded to a numerical value having a small number of digits. Typical examples of this rounding method include rounding off, rounding down, rounding up, or other such method of simply shortening the number of effective digits. Specifically, a method of extracting the more significant 4 bits when an 11-bit numerical value is rounded to a 4-bit numerical value is applicable.

According to this method, in the numerical value rounded to 4 bits, an interval exhibited by the adjacent numerical values, for example, 1100 and 1101, is the same between the other numerical values, and the intervals are equal. The method of rounding the numerical value, which has such properties, is hereinafter referred to as "even rounding method".

In contrast, in the uneven rounding method, of the rounded numerical values, the intervals between the adjacent numerical values are not necessarily equal. For example, in the numerical value rounded to 4 bits, the interval indicated by 0010 and 0011 and the interval indicated by 1100 and 1101 may be different. The method of rounding the numerical value, which has such properties, is hereinafter referred to as "uneven rounding method".

As described with reference to FIG. 9, the value indicated by the plotted dot displayed in the graph display area 63 is desired to be presented with a high resolution in the segment 72 due to a great influence to be exerted for the user by a slight difference in value. Meanwhile, the segment 71 is not so important, and hence it suffices that the resolution is low. However, in terms of an equal scale, the length of the segment 71 is sometimes longer than the segment 72, and hence in a case where the balance information is stored through use of the numerical value having the resolution lowered by the even rounding method, the unimportant segment 71 has an unnecessary resolution when the numerical value is rounded so as to achieve a sufficient resolution in the important segment 72, which leads to insufficient compression of the information amount. When the numerical value is rounded so as to achieve a required degree of resolution in the unimportant segment 71, there occurs such a situation that sufficient information cannot be obtained due to an insufficient resolution of the important segment 72.

Figure 10:
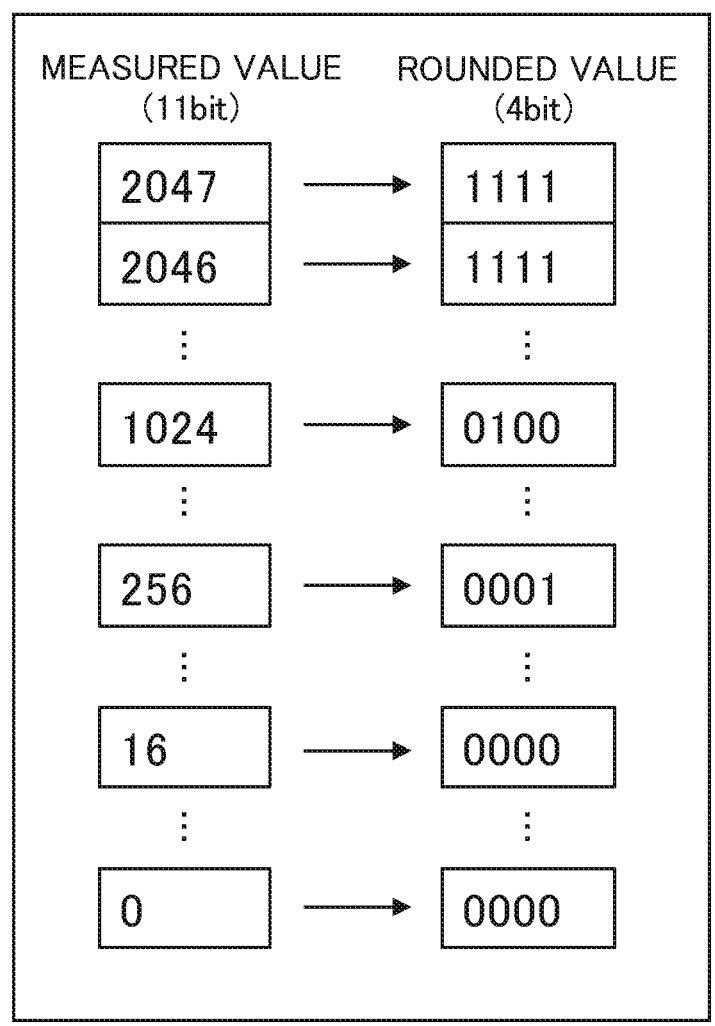
FIG. 10 is a table for showing an example of a conversion table to be used for an uneven rounding method.

In view of this, when the obtained measured value is to be stored, the uneven rounding method is used to lower the resolution so that the important segment 72 of FIG. 9 has a sufficiently fine resolution and the unimportant segment 71 has a rough resolution to the necessary minimum. Specifically, such a conversion table as shown in FIG. 10 is used to convert a measured value into a rounded numerical value. In this example, the measured value has an 11-bit resolution and is represented in decimal, while the rounded numerical value has a 4-bit resolution and is represented in binary.

The measured value takes a numerical value ranging from 0 to 2047. The first-half range of the smaller measured value, namely, 0 to 1024, has a rough resolution and has a rounded numerical value assigned thereto, and 0 to 4 within a range from 0 to 15 (in decimal) taken by the rounded numerical value are assigned. In contrast, the second-half range of the larger measured value, namely, 1025 to 2047, has a high resolution and has a rounded numerical value assigned thereto, and 5 to 15 within the range from 0 to 15 taken by the rounded numerical value are assigned. The numerical value in the second-half range has about three times as high a resolution as the numerical value in the first-half range.

In this manner, by using the numerical value obtained by reducing the resolution through use of the uneven rounding method to compress the information amount as the balance information, it is possible to set only the numerical value in the range important to the user to have a high resolution and set the other range to have a low resolution, to thereby be able to reduce the entire information amount without lowering the resolution in the range important to the user more than required.

The embodiment of the present invention has been described above, but a specific configuration of this embodiment is described as an example, and the technical scope of the present invention is not intended to be limited thereto. For example, the electronic wristwatch 1 according to the embodiment of the present invention includes the power generation amount measuring module 43, the battery voltage measuring module 44, and the in-use function detector 46. However, it suffices that the electronic wristwatch 1 includes at least any one of the power generation amount measuring module 43 or the battery voltage measuring module 44, and the electronic wristwatch 1 does not necessarily include the in-use function detector 46. The mobile terminal 30 may receive any one of the transition of the power generation amount and the transition of the battery voltage from the electronic wristwatch 1, and may cause the connection time period determiner 33a to determine the connection time period of the connection to the electronic wristwatch 1. Further, an electronic wristwatch is described as a device to be used in the above-mentioned embodiment, but the present invention is not limited to the electronic wristwatch, and may be applied to a more general electronic clock. Further, the device to communicate to/from the electronic clock is not limited to a mobile device, and may be a general computer, for example, a stationary computer. A person skilled in the art may appropriately modify those disclosed embodiments, and it is to be understood that the technical scope of the invention disclosed in the present application includes modifications thus made.

The invention claimed is:

1. An electronic clock, comprising:
   a power generator;
   a secondary battery, which is configured to be charged with electric power generated by the power generator;
   a balance information transmitter configured to transmit, to a computer, balance information relating to a transition of a power generation amount or a charging balance of the secondary battery;
   a connection time period setting module configured to set a connection time period of a connection with the computer based on the balance information; and
   a communication controller configured to control a start and an end of communication to/from the computer based on the connection time period.

2. The electronic clock according to claim 1, further comprising a connection time period receiver configured to receive the connection time period determined by the computer.

3. The electronic clock according to claim 1, further comprising a balance information storage configured to store the balance information.

4. The electronic clock according to claim 1, wherein the communication controller includes:
   a start controller configured to start communication to/from the computer at a start time set in advance; and
   an end controller configured to end the communication to/from the computer at an end time, where the end time is a time at which the connection time period has elapsed from the start time.

5. The electronic clock according to claim 1, further comprising:
   a power generation amount measuring module configured to measure the power generation amount generated by the power generator; and
   an in-use function detector configured to detect a function in use,
   wherein the balance information transmitter is configured to transmit, to the computer, information relating to transitions of the power generation amount and the function in use.

6. The electronic clock according to claim 1, wherein the communication controller is configured to execute, when a predetermined condition is satisfied, temporary communication that terminates communication immediately after at least reception of time infuriation from the computer and the transmission of the balance information to the computer.

7. The electronic clock according to claim 6, wherein the predetermined condition includes a condition that a predetermined time period has elapsed within one day and surroundings of the electronic clock are bright.

8. The electronic clock according to claim 1, wherein the communication controller is configured to permit both temporary communication and continuous communication, or disapprove the continuous communication while permitting only the temporary communication, based on a remaining amount of the secondary battery.

9. The electronic clock according to claim 1, wherein the balance information has a resolution lowered, by an uneven rounding method, with respect to a measured value for obtaining the balance information.

10. A communication control system, comprising:
    a power generator;
    a secondary battery which is configured to be charged with electric power generated by the power generator;
    a computer;
    balance information transmitter configured to transmit to the computer balance information relating to a transition of a power generation amount or a charging balance of the secondary battery;
    a connection time period setting module configured to set a connection time period of a connection with the computer based on the balance information; and
    a communication controller configured to control a start and an end of communication to/from the computer based on the connection time period, wherein the computer includes:
- a connection time period determiner configured to determine the connection time period based on the balance information; and
- a display configured to display a transition of the balance information and the connection time period.

11. The communication control system according to claim 10, wherein the connection time period determiner includes an extended time period determiner configured to determine an extended time period to be added to the connection time period or a shortened time period based on the balance information.

12. The communication control system according to claim 10, wherein the computer is configured to notify a user of a state relating to a continuous connection with the electronic clock.

13. The communication control system according to claim 12, wherein the notification includes at least any one of expiration of a communication continuation time period, a warning relating to insufficiency of the power generation amount or the charging balance, a failure in achieving a target of the power generation amount or the charging balance set by the user, or a warning that the continuous connection has been disapproved.

14. The communication control system according to claim 10, wherein the transition of the balance information to be displayed on the display is plotted through use of a scale that is not fixed.

15. The communication control system according to claim 10, wherein the transition of the balance information to be displayed on the display is plotted through use of an equal interval scale for the balance information.

* * * * *